(12) United States Patent
Schäfer (10) Patent No.: US 8,634,954 B2
(45) Date of Patent: Jan. 21, 2014

(54) SYSTEM AND METHOD FOR HANDLING RETURNED GOODS IN AN ORDER-PICKING SYSTEM

(75) Inventor: Gerhard Schäfer, Neunkirchen (DE)

(73) Assignee: SSI Schaefer Peem GmbH, Graz (AT)

( * ) Notice: Subject to any disclaimer, the term of this patent is extended or adjusted under 35 U.S.C. 154(b) by 1068 days.

(21) Appl. No.: 12/642,680

(22) Filed: Dec. 18, 2009

(65) Prior Publication Data

US 2010/0198391 A1 Aug. 5, 2010

Related U.S. Application Data

(63) Continuation of application No. PCT/EP2008/005790, filed on Jul. 16, 2008.

(30) Foreign Application Priority Data

Jul. 18, 2007 (DE) .......................... 10 2007 034 705

(51) Int. Cl.
*G06F 7/00* (2006.01)
(52) U.S. Cl.
USPC ........................................ 700/216; 700/230
(58) Field of Classification Search
USPC .................................. 700/216, 230
See application file for complete search history.

(56) References Cited

U.S. PATENT DOCUMENTS

| 7,197,374 B2* | 3/2007 | Silverbrook et al. | 700/215 |
| 2003/0065421 A1* | 4/2003 | Didriksen et al. | 700/230 |

* cited by examiner

*Primary Examiner* — Ramya Burgess
(74) *Attorney, Agent, or Firm* — McNeely, Hare & War LLP; Kevin J. McNeely (57) ABSTRACT

A system and method for storing returned goods (56) of different type of goods in an order-picking system (10), wherein the order-picking system (10) comprises a container warehouse (12) for providing a plurality of storage containers (52, 54), and at least one workstation (14) at which the returned goods (56) in the storage containers (52) from the container warehouse (12) are, in a return mode, delivered, the method comprising the following steps: providing (70) at least one returned good (56) of a first type of goods at a delivering station (16), detecting (72) of each of the returned goods (56) and, preferably separately, delivering the returned goods (56) to a returned-goods conveyor (32) conveying the returned goods (56) to the workstation (14), identifying (74) the type of goods of each of the detected returned goods (56), identifying (76) a storage container (52) with which the respectively identified type of goods is associated, retrieving (78) the respectively associated storage container (52) from the container warehouse (12), and conveying this storage container (52) to the workstation (14), and at the workstation (14) delivering (80) the returned goods (56) to the associated storage container (52).

16 Claims, 7 Drawing Sheets

Fig. 7

SYSTEM AND METHOD FOR HANDLING RETURNED GOODS IN AN ORDER-PICKING SYSTEM

RELATED APPLICATIONS

This is a continuation application of the co-pending international application PCT/EP2008/005790 (WO 2009/010274 A1) filed on Jul. 16, 2008 which claims priority of the German patent application DE 10 2007 034 705.9 filed on Jul. 18, 2007, which is fully incorporated by reference.

BACKGROUND OF THE INVENTION

The present invention relates to a method for storing returned goods of different types of goods in an order-picking system.

The present invention further relates to an order-picking system for handling returned goods of different types of goods.

PRIOR ART

Systems for handling returns are disclosed in the document DE 198 38 319 B4 as well as WO 2005/030615.

The document EP 1 626 013 A1 discloses a method for matching together goods in a warehouse, and handling returned goods. Therein, particularly the handling of so-called slow-moving items is explained, which are picked at workstations and subsequently brought to a handing-over point via a sorting device, where they are packed into shipping containers. Completely packed shipping containers are transported to a shipping area.

The document WO 2005/030615 substantially shows an order-picking system mainly operated in an order-picking mode. For this purpose, articles or goods are transported in storage containers from a container warehouse via a storage-container conveyor to the order-picking station. The articles to be picked are removed, when they have reached the order-picking station, and given into so-called order-picking buckets from where they are delivered to so-called order containers. An order container represents a type of collecting container for all articles belonging to one picking order. A picking order typically represents an arrangement of different articles or goods at different numbers. For processing a picking order, the storage containers, containing the articles to be picked, are retrieved by means of the storage-container conveyor, and subsequently stored back again via the storage-container conveyor. The order containers are delivered via an order-container conveyor to the order-picking station, and from there they are transported away by means of the order-container conveyor.

The document WO 2005/030615 further discloses a (separate) correction-conveyor line which can be used for the purpose of a supplementary picking process or storage of storage containers.

Other conventional systems use so-called sorting devices comprising a plurality of target locations (e.g. 150). Each of the target locations can be controlled individually so that a chaotic stream of returned goods can be sorted, for example, by directing returned goods of the same type to one and the same target location. The great number of target locations is a disadvantage of this prior art, because it results in a correspondingly huge spatial space required.

SUMMARY OF THE INVENTION

Therefore, it is an object of the present invention to provide a compact order-picking system for handling returned goods. Particularly, ergonomic aspects are to be considered. Preferably, it should be possible to convert a conventional order-picking system by as few as possible and as space-saving construction measures for handling returned goods.

This object is solved by the method as mentioned at the outset, wherein the order-picking system comprises a container warehouse for providing a plurality of storage containers, and at least one work station at which, in a return mode, returned goods are delivered from the container warehouse in storage containers, the method comprising the following steps: providing at least one returned goods of a first type of goods at a delivery station; detecting each of the returned goods and, preferably individually, delivering the returned goods to a returned-goods conveyor conveying the returned goods to the workstation; identifying the type of goods of each detected returned goods; identifying a storage container associated with the respectively identified type of goods; retrieving the respectively associated storage container from the container warehouse, and conveying this storage container to the workstation; and at the workstation delivering the returned goods to the respective storage container associated therewith.

This object is further solved by an order-picking system as mentioned at the outset comprising the following features: an order-picking system for providing a plurality of storage containers; at least one workstation; at least one delivery station comprising a detecting device where returned goods are provided and detected; a returned-goods conveyor for conveying returned goods from the delivery station to the workstation; a storage-container conveyor for conveying storage containers to the workstation; and a warehouse-management system which, in a return mode, is suitable to identified detected returned goods with regard to the type of goods thereof, in order to retrieve from the container warehouse a storage container associated with the identified type of goods and convey same to the workstation, where the identified returned goods are delivered to the associated storage container.

In accordance with the present invention a return shipment of returned goods, which can comprise a plurality of different types of goods, is unpacked at a delivery station, scanned and delivered to the returned-goods conveyor for conveying the returned goods to the workstation. At the delivery station the returned goods are linked, in a data technical manner, to an associated storage container. While the returned goods are transported to the workstation, the associated storage containers are retrieved, preferably in a sequence according to which the returned goods are given to the returned-goods conveyor, and thus are conveyed to the workstation. Hence, at the workstation, a worker merely needs to take care that the returned goods are given in the right storage container. In this manner a lot of time can be saved in comparison to a situation where the returned goods would be unpacked and identified only at the workstation. Then, a corresponding additional time would be required until the associated storage containers could be retrieved from the container warehouse.

Thus, a storage-container stream merges, preferably in a synchronized manner, in a stream of returned goods at the workstation.

It is possible to merely provide one single target location within the meaning of the above-mentioned prior art. This results in significant savings of space.

Further, it is also possible to operate the workstation in an order-picking mode so that workstations can be operated at two functions. Alternatively, an existing order-picking station can be converted by installing an additional returned-goods conveyor at the workstation, or by correspondingly converting a storage-container conveyor, which already exists.

If at least one horizontally rotating container rack, such as a carousel, is used as the container warehouse, high dynamics are achievable in the region of the conveyor warehouse, the dynamics being required under certain circumstances for retrieving, in a sequenced manner, storage containers within a very short period of time. A horizontally rotating container rack represents a first sequencing stage.

In accordance with a preferred embodiment a length and/or a transporting velocity of the returned-goods conveyor towards the workstation is selected such that sufficient time for sequencing the storage containers to be retrieved is available.

In accordance with another embodiment also a number of returns of the same type of goods delivered to the returned-goods conveyor are detected in addition.

This information can be stored in order to allow retrieval of a current stock. Combining identical returned goods upon the unpacking step decreases the number of storage-container cycles, and decreases the time needed for storing back the returned goods.

If human beings are used for solving a return of returned goods, returned goods of an identical type can be taken from the plurality of different returned goods by them, and a group of returned goods of the same type can be delivered to the returned-goods conveyor. This procedure is advantageous in that the storage containers associated with this type of goods do not need to be retrieved from the container warehouse for one and the same return and transported to the workstation.

Further, it is advantageous if the workstation, in an order-picking mode, is used for picking goods from the storage containers into the order-containers.

The workstation can thus be operated in a double mode. For example, returns could be handled in the morning, and at the evening one could pick.

Further, it is advantageous if a storage-container conveyor is provided between the at least one workstation and the container warehouse for delivering and transporting away containers, and an order-container conveyor is provided for delivering and transporting away order containers to and from the workstation, the order-container conveyor being preferably arranged, in the region of the workstation, lower than the storage-container conveyor.

In accordance with another embodiment the storage-container conveyor is used as a returned-goods conveyor, and is operated oppositely in the return mode in comparison to the order-picking mode.

In this manner no additional conveyor needs to be provided for transporting the returned goods, so that costs can be saved as far as the purchase of such an order-picking system is concerned.

In accordance with another particular embodiment of the system the delivery station is coupled to the storage-container conveyor.

In this manner the above-described effect can be achieved.

Also, it is advantageous if the returned-goods conveyor is a separate conveyor relative to the storage-container conveyor.

Then, it is possible that returned goods can be given into storage container in an automated manner. In this case the workstation can be operated simultaneously in the order-picking mode and the return mode, since the storage-container conveyor is not required for transporting the returned goods.

It is particularly preferred if the returned-goods conveyor comprises a handing-over point at each of the workstations, where the returned goods can be delivered to the associated storage containers, particularly downwards from the top.

Downward delivery from the top facilitates, on the one hand, an automated delivery, particularly in the context of so-called "droppable" articles. On the other hand, this increases the ergonomics if the returned goods need to be delivered manually to the order containers.

Also, it is advantageous if additionally an order-container conveyor is provided, on which substantially order-containers are conveyed, if the system is operated in an order-picking mode, and on which substantially associated storage containers are conveyed in the return mode.

In this instance the storage-container conveyor can be used for transporting the returned goods.

Additionally, the returned-goods conveyor can comprise a returned-goods sequencing device. Alternatively or additionally, the conveyor provided for the purpose of conveying the associated storage containers in the return mode can comprise a storage-container sequencing device as well.

By this measure, the likelihood can be increased that the right storage container is present at the handing-over point at the right time, or that the returned goods are located at the right location at the right time.

It is clear that the above-mentioned and hereinafter still to be explained features cannot only be used in the respectively given combination but also in other combinations or alone without departing from the scope of the present invention.

BRIEF DESCRIPTION OF THE DRAWINGS

Embodiments of the invention are illustrated in the drawings, and will be explained in more detail in the following description, wherein.

PREFERRED EMBODIMENTS OF THE INVENTION

In the following description identical elements will be designated by the same reference numerals. An order-picking system in accordance with the present invention is generally designated by 10.

Figure 1:
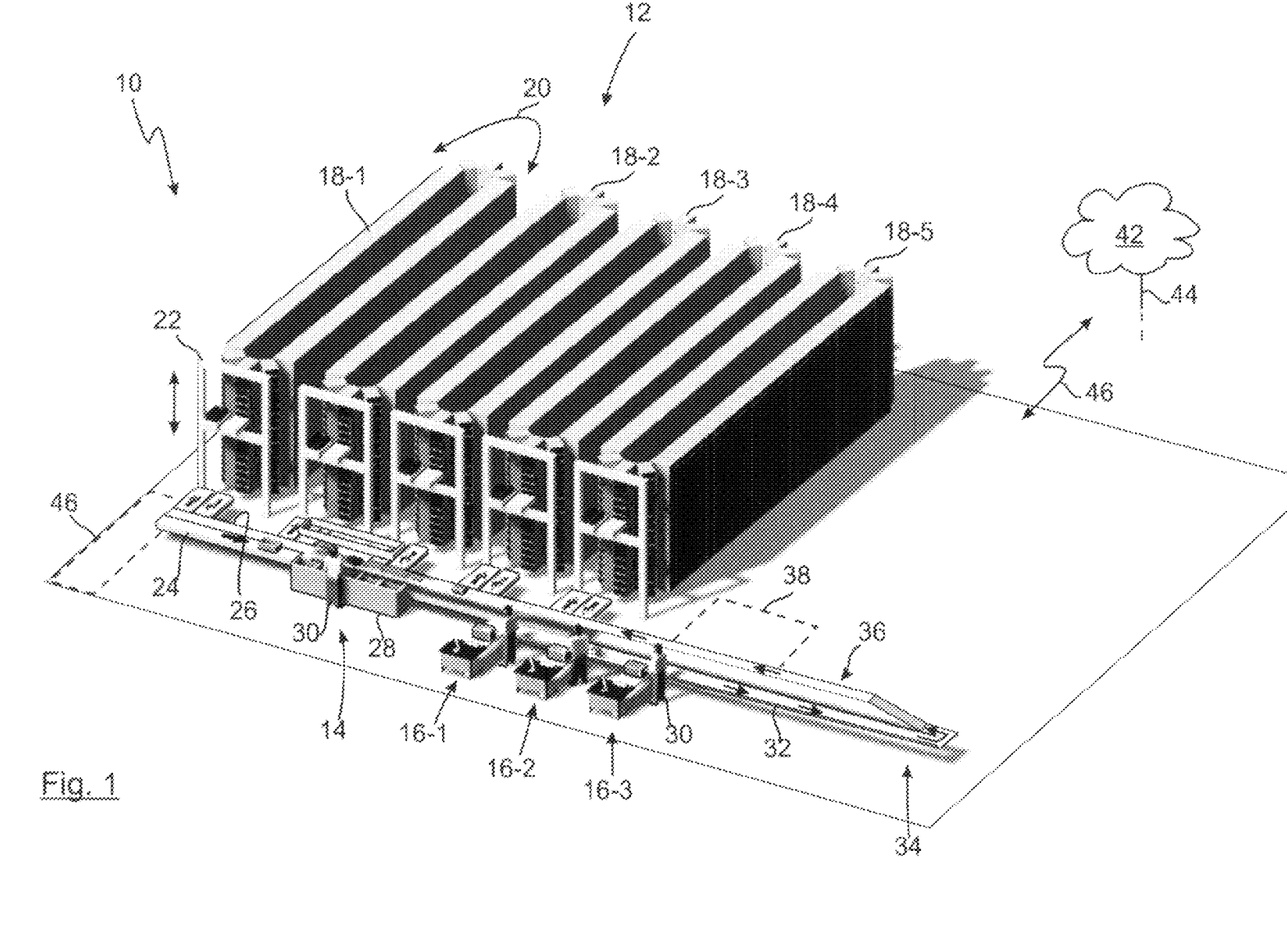
FIG. 1 shows a perspective view of an order-picking system in accordance with the present invention.

FIG. 1 shows a schematic perspective view of an order-picking system 10 in accordance with the present invention.

The order-picking system 10 comprises a container warehouse 12. It is clear that the present invention is not only suitable for containers being used as storage units but also for any other type of load support (e.g. trays, pallets, etc.).

Further, a workstation 14 and three delivery stations 16-1, 16-2 and 16-3 are exemplarily shown in FIG. 1. At the delivery station 16 returned goods are fed into the system. At the workstation 14 the returned goods are given (automated and/or manually) into storage containers, being not designated in more detail here, which have been retrieved beforehand from the container warehouse 12 and will be stored back into the storage warehouse 12 after filling with returned goods.

The container warehouse 12 comprises, for example, a plurality of horizontally movable racks 18-1 through 18-5, which are also known as carousels. Alternatively, other rack systems such as an automatic small parts warehouse, ASPW, could be used as well. The carousels 18 are respectively movable into both directions as depicted by a double arrow 20. At a front end of the carousels 18 respectively one vertical elevator 22 is provided which delivers storage containers from the carousel to a storage-container conveyor 24, 26 or retrieves the same therefrom.

The storage-container conveyor 24 is used for transporting storage containers from the workstation 14, and preferably forms a conveyor loop together with the storage-container conveyor 26 being responsible for the feeding back of the storage containers being filled with returned goods. Such conveyor loops can comprise injecting and/or discharging devices for shortening the path of a storage container so that the storage container does not need to travel the entire loop for being conveyed back again into a predetermined rack compartment of the carousel 18.

The workstation 14 of FIG. 1 further comprises optionally one storage-container buffer 28 in which a number of storage containers can be parked until returned goods associated therewith can be delivered thereto. This can happen manually by an operator 30. However, it is also possible to deliver the returned goods in an automated manner to the storage containers, as it will be described hereinafter in more detail. In this case, the workstation 14 is more like a handing-over point, since an order-picking person 30 is not needed at the workstation 14.

The delivery stations 16 are also operated manually by operators 30 in the example of FIG. 1. Alternatively, the delivery stations 16 could be operated in an automated manner as well.

The delivery stations 16 comprise, for example, a working area on which returns, such as packages containing the returned goods, can be opened. The operator 30 removes the returned goods, and detects the respective type of goods. For example, this can happen by using a scanner or a barcode reader (not shown). If returned goods have been detected, the operator 30 can deliver same to a returned-goods conveyor 32. A transporting direction of the returned goods is indicated by means of arrows. The exemplary returned-goods conveyor 32 is arranged here, for example, in an ergonomic height of the operator's 30 hip. Also, particularly heavy returned goods can be pushed directly from the working area onto the conveyor 32. The returned-goods conveyor 32 here exemplarily first leaves the workstation 14 and the delivery stations 16 for being redirected in a turn-around region 34 to a portion 36 being located higher so that the returned goods are preferably delivered in a chest-high at the location of the workstation 14. The course is selectable freely. Chest-high delivery increases the ergonomics for the operator 30 at the workstation 14. Then, the operator 30 does only need, if at all, to give the returned goods downward into a storage container.

The returned-goods conveyor 32 can optionally comprise a returned-goods sequencing device 38, which is indicated in FIG. 1 by a dashed line. Also, the storage-container conveyor 24, 26 can comprise an optional storage-container sequencing device 40.

Figure 7:
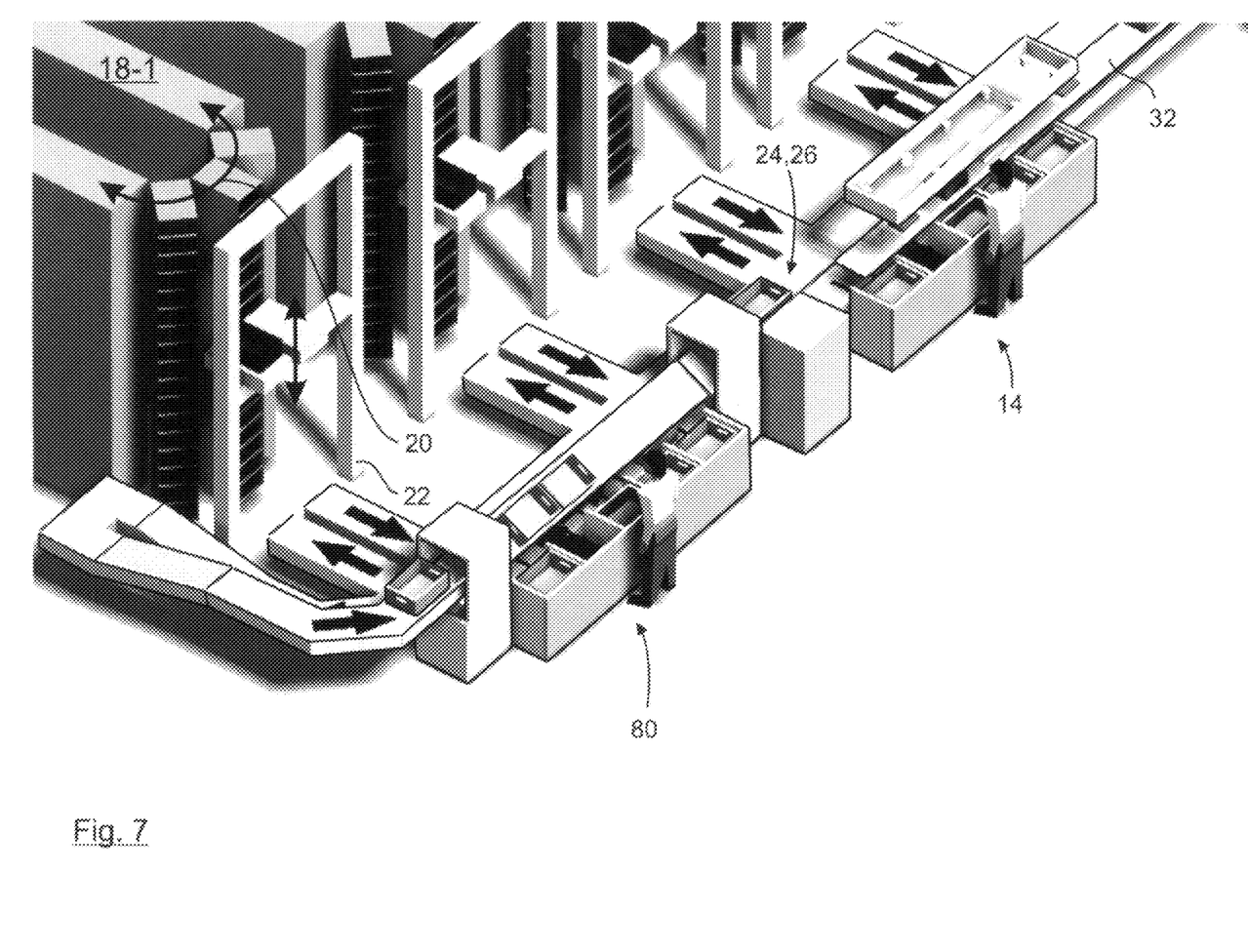
FIG. 7 shows a workstation combined with an order-picking station.

It is clear that an order-picking station can be employed as the workstation 14, the order-picking station being disclosed in the German patent application DE 10 204 001 841 on behalf of the SSI Schäfer Peem company (cf. also FIG. 7). The structure of the order-picking station is explicitly described there so that here the just mentioned patent application is explicitly incorporated herewith.

In the present FIG. 1, the returned-goods conveyor 32 can be realized by the storage-container conveyor of the known order-picking station, wherein the delivery stations 16, being depicted here, are coupled to the conventional storage-container conveyor. Then, the storage-container conveyor can be operated in an opposite direction. Instead of filling order containers, then storage containers are filled, which in turn are transported on the conventional order-container conveyor to the order-picking station.

Alternatively, the conventional order-picking station can be used, wherein the returned-goods conveyor 32 is additionally led into the working region of the order-picking station so that an order-container conveyor, a storage-container conveyor and a returned-goods conveyor lead into the region of the order-picking station, or are brought out thereof.

Some or all elements of the present order-picking system 10 are coordinated and controlled by a superordinated warehouse-management computer 42. The warehouse-management computer 42 comprises in particular a material flow computer (not shown). Communication between the different components either happens via fixed lines 44 and/or wireless connections 46.

Type of goods of the respective returned goods, which are detected at the delivery stations 16, are transmitted to the warehouse-management computer 42. The warehouse-management computer 42 looks in the container warehouse 12 for a storage container, which is associated with this returned goods. The returned goods and the storage container are "married" with each other in terms of data processing. All other actions should be scheduled so that, if the returned goods arrive at the workstation 14, also the associated storage container has either already arrived or arrives there at the same time. If the storage container arrives earlier, then it can be stored in the storage-container buffer 28 and wait for the arrival of the returned goods associated therewith.

Of course, also other racks could be used such as carousels or rotary racks 18. The usage of horizontally rotating racks 18, however, is advantageous since these racks already represent a first sequencing stage. The warehouse-management computer 42 preferably selects one storage container being arranged next to the vertical elevator 22 for keeping the paths as short as possible. As an additional remark is to be noted that a range of articles typically is mapped several times on the container warehouse. Thus, a second sequencing stage is represented by the selection of one of the carousels 18-1 through 18-5.

The optional sequencing devices 38 and 40 represent a third and fourth sequencing stage.

It is clear that the length and the transporting velocity of the returned-goods conveyor 32 influence how fast the returned goods, after they have been detected, identified and associated, are reaching the workstation 14. If a lot of different returned goods need to be processed at the same time, it is recommendable to keep the length sufficiently large and the transporting velocity relatively low, in order to allow the warehouse-management computer 42 to bring the right storage container just in time from the container warehouse 12 to the workstation 14. The warehouse-management computer 42, or a subordinated material flow computer (not shown), can also be used for optimizing whereabouts of storage containers at the workstation 14 or in the vicinity of the handing-over points of FIG. 4. If the control "knows", for example, the next after the next returned goods is of the same type and needs the same storage container, then it remains at the workstation or at least in an (immediate) vicinity.

Preferably the returned-goods conveyor 32 is divided into subsequently arranged sections or windows (not shown), in terms of data processing, into which identified returned goods or groups of an identical type of goods can be given. Roller conveyors or belt conveyors can be used as conveyors, which are preferably segmented.

Figure 2:
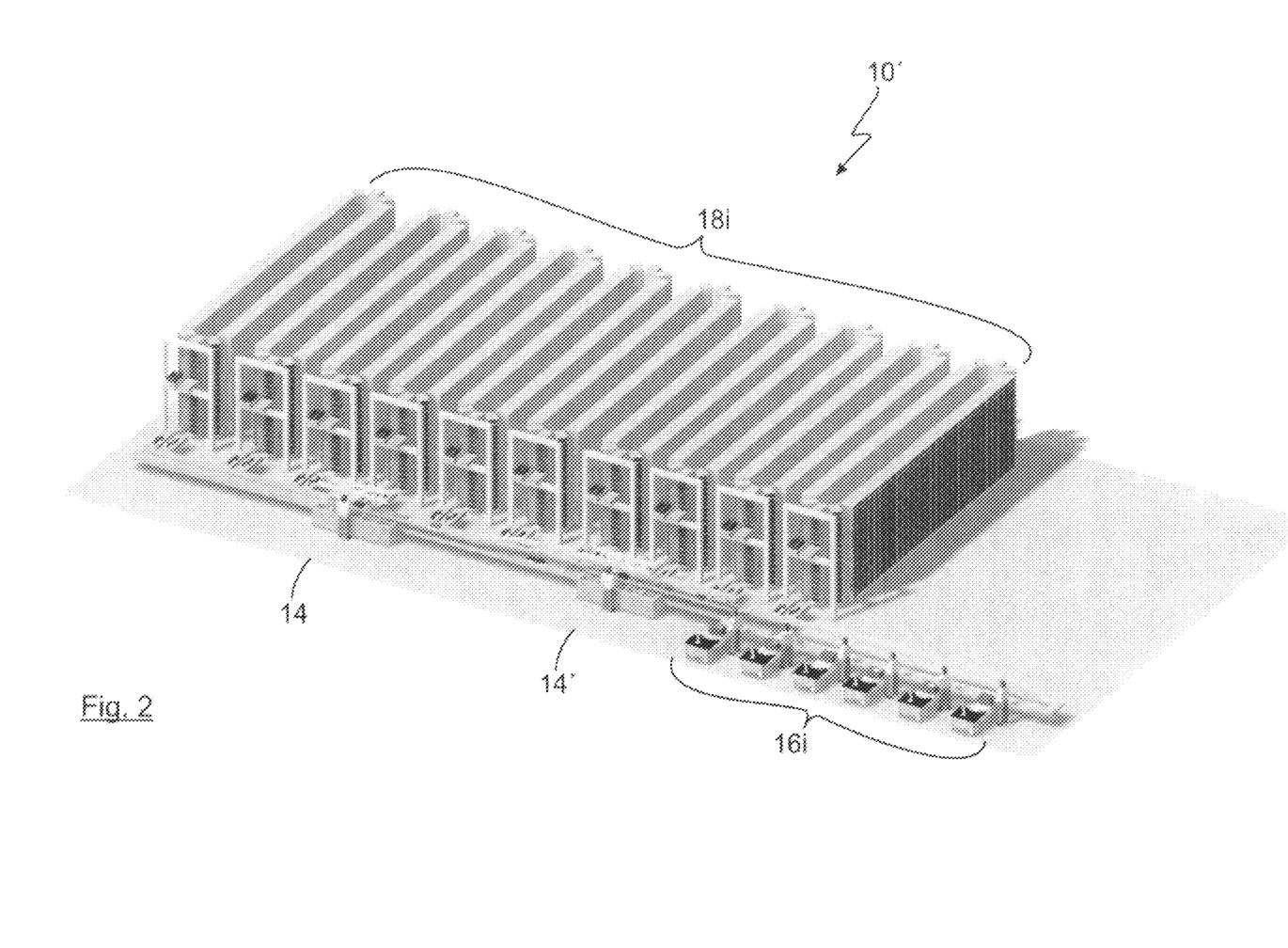
FIG. 2 shows a modification of the order-picking system of FIG. 1.

In FIG. 2 another embodiment of an order-picking system 10' is shown, which does not substantially differ from the order-picking system 10 of FIG. 1. The order-picking system 10' of FIG. 2 comprises still more carousels 18i. Additionally, another workstation 14' is provided which in turn represents another sequencing stage. Also, a number of delivery stations 16i is shown.

Figure 3:
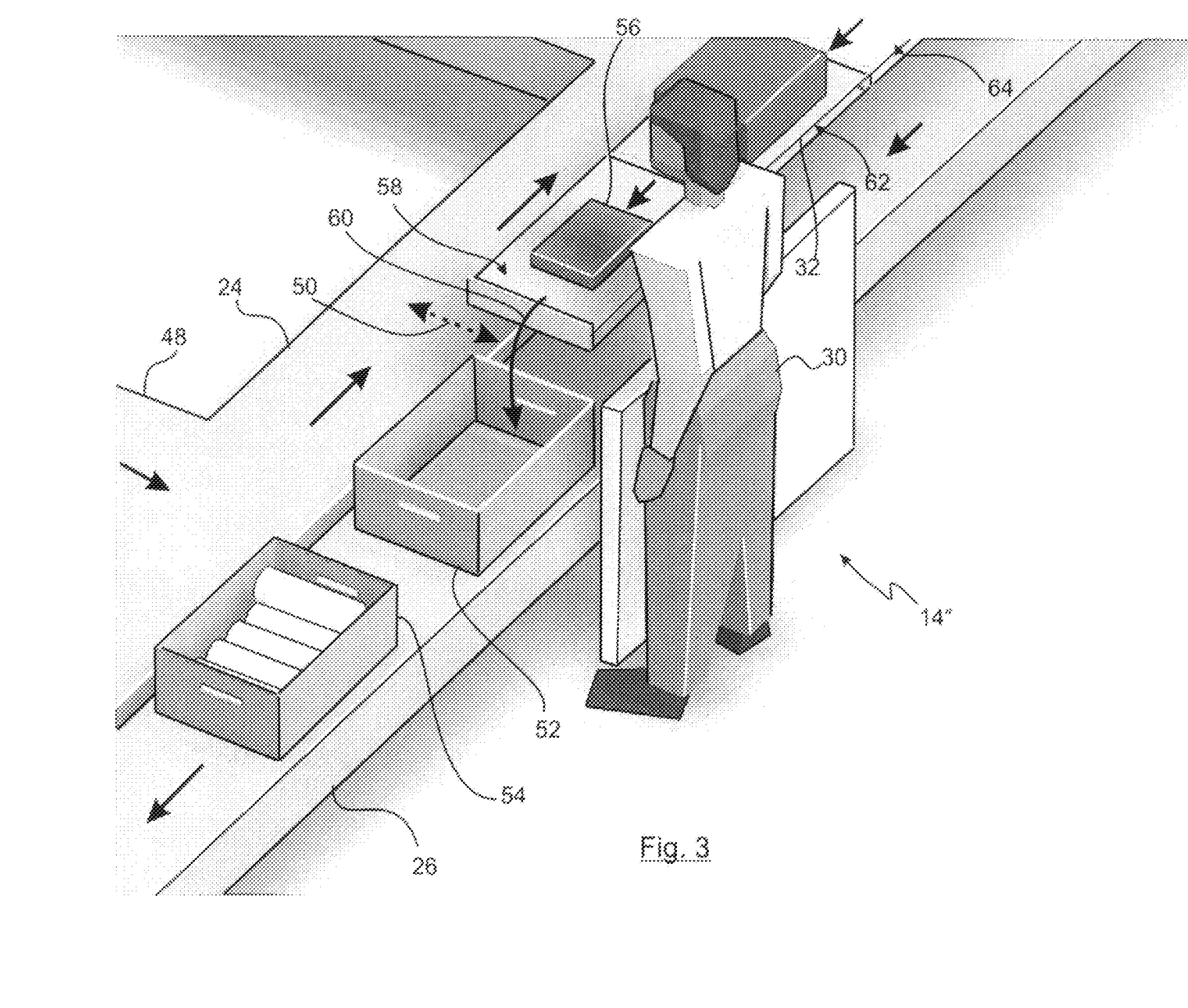
FIG. 3 shows a detailed view of a workstation in accordance with the present invention.

With reference to FIG. 3 a detailed view of a workstation 14" is shown.

The storage-container conveyors 24, 26 are arranged in a lower height. The transporting directions are indicated by arrows. Injecting and/or discharging devices 50 can be provided for exchanging empty storage containers 52 between the conveyors 24 and 26. A storage container 54, already filled with returned goods, is also shown.

The returned-goods conveyor 32 is preferably arranged on a higher level than the conveyors 24, 26, particularly chest-high relative to an operator 30 (ergonomics). Different returned goods 56 are transported towards the operator 30, as indicated by arrows. A handing-over location 58 is provided directly in front of the operator 30, where the operator 30 can take the returned goods 56 and deliver same along an arrow 60 downward into an empty order container 52 waiting already.

The returned-goods conveyor 32 here comprises a number of segmented belts 62, 64.

Figure 4:
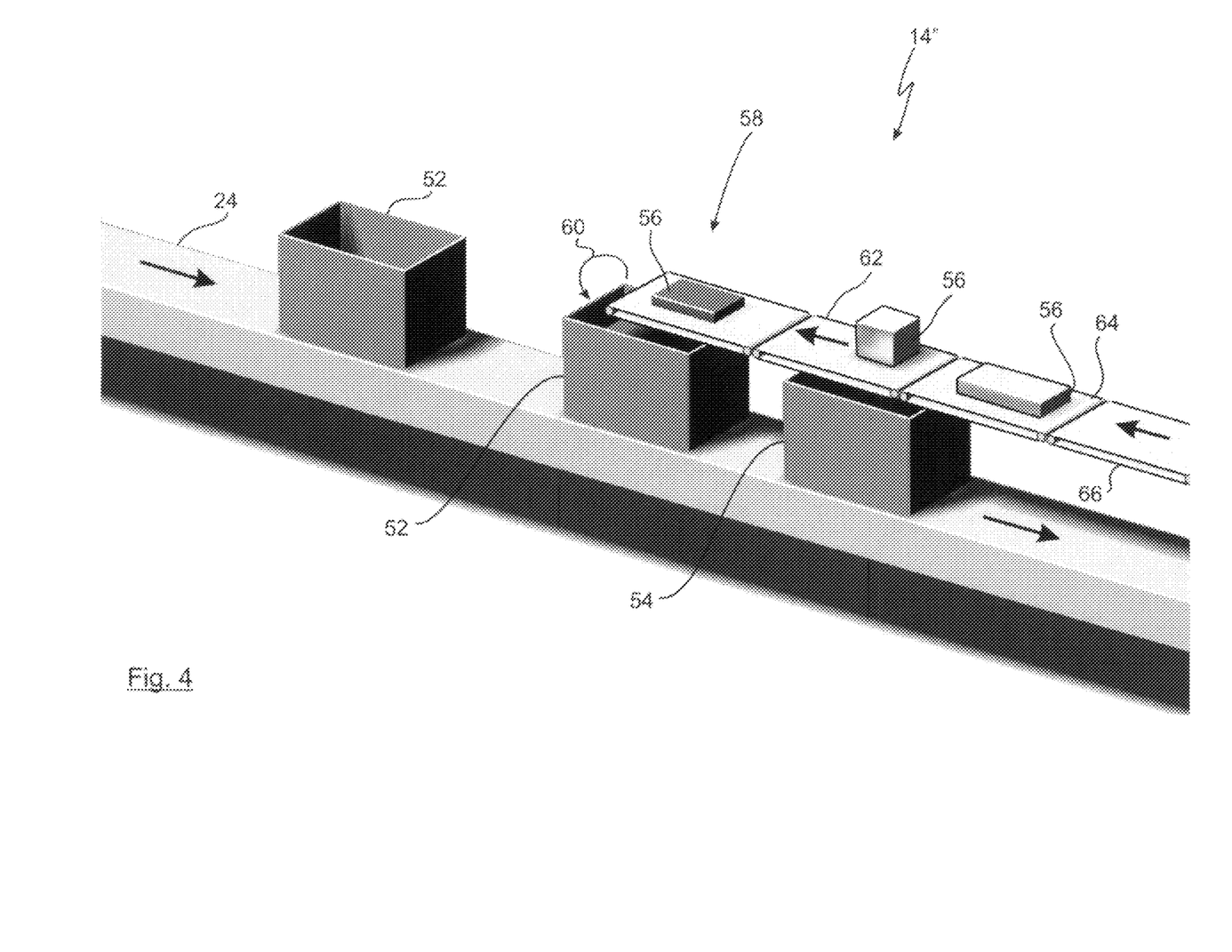
FIG. 4 shows a modification of the workstation of FIG. 3.

With reference to FIG. 4 a modification of the workstation 14" of FIG. 3 is shown. The workstation 14" of FIG. 4 is completely automated. The operation and presence of an operator 30 is not necessarily required. The returned goods 56 are conveyed to the handing-over location 58 via the different conveyor-belt segments 62 through 66, where they are dropped into empty storage containers 54 being provided there. It is clear that the returned goods 56 in this case need to be goods of the type "droppable". But also goods of the so-called type "non-droppable" can be handled in an automated manner by suitable additional feeding and assisting devices.

Figure 5:
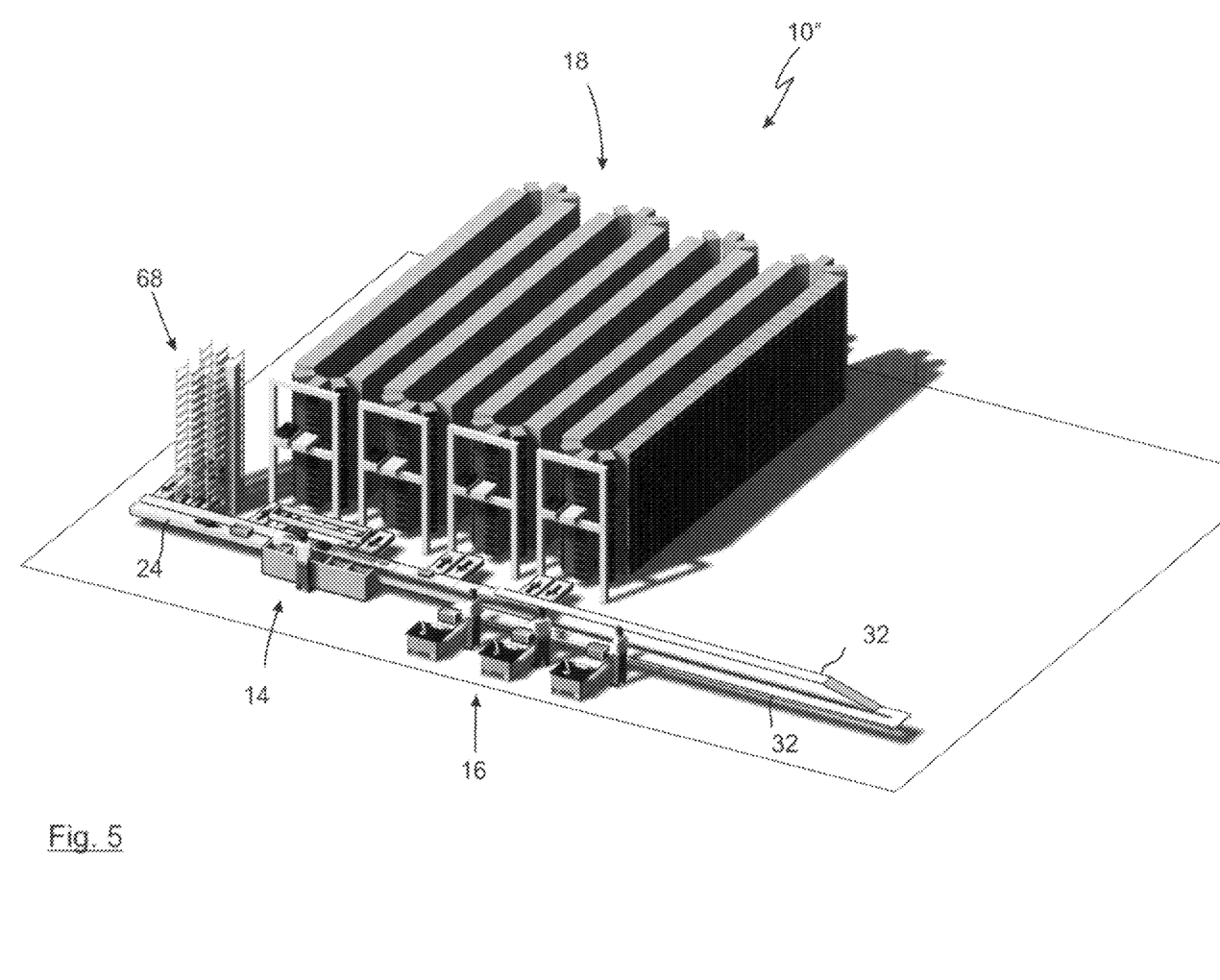
FIG. 5 shows another embodiment of an order-picking system in accordance with the present invention.

With reference to FIG. 5 another embodiment of an order-picking system 10" is shown.

The order-picking system 10" is set up similarly like the order-picking system 10 of FIG. 1; however it additionally comprises a so-called fast-moving item rack 68. In this rack 68 storage containers are stored which in particular are frequently needed for storing returned goods.

Figure 6:
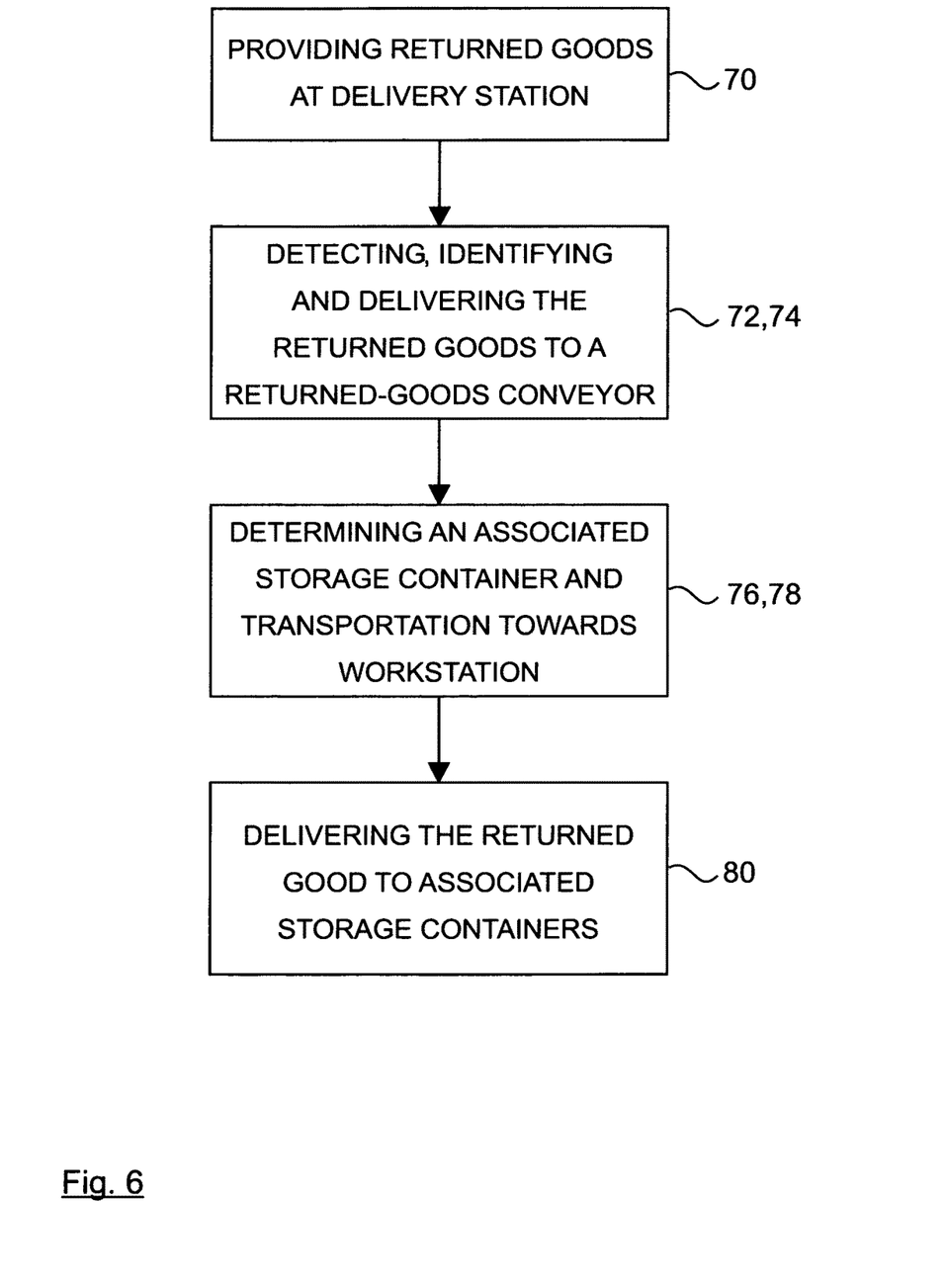
FIG. 6 shows a flowchart of the method of the invention.

With reference to FIG. 6 the method of the invention is illustrated in a heavily simplified manner.

In a first step, returned goods of a first type of goods are provided at a delivering station (cf. block 70). In a second step (block 72) each of the returned goods is detected, and preferably delivered separately to the returned-goods conveyor. In a step 74, the detected type of goods is identified. Subsequently, a storage container is determined (cf. block 76), which normally contains the identified type of goods or which is associated with the identified type of goods.

In a further step 78, this associated storage container is retrieved from the container warehouse, and transported to the workstation. In a step 80, the detected and identified returned goods are delivered to the associated storage container.

It is clear that the detecting device for detecting the returned goods does not necessarily need to be arranged at the delivery station. It is true that scanners and bar code reading devices have proven to be of advantage. However, it will also be possible to use automated recognition devices which are preferably arranged in immediate vicinity relative to the delivery station. These automated recognition devices could be, for example, cameras which forward their signal to the superordinated warehouse-management computer, i.e. the images of the conveyor are forwarded for evaluation.

FIG. 7 finally shows a workstation 14 and an order-picking station 80 comprising an obliquely arranged conveyor for feeding storage containers towards the order-picking station, in order to remove articles and give the same into order container. Both the order-picking station 80 and the workstation 14 are supplied with full and empty storage containers by the storage-container conveyor 24, 26.

I claim:

1. In an order-picking system comprising
a container warehouse providing a plurality of storage containers,
at least one workstation arranged, in a picking mode, as an order-picking station configured for picking goods from the storage containers into order containers,
at least one delivery station having a detecting device, where returned goods are provided and detected,
a returned-goods conveyor arranged to convey returned goods from the delivery station to the workstation,
a storage-container conveyor arranged to convey the storage containers to the workstation, and
an order-container conveyor arranged to convey the order containers to the workstation, wherein the returned-goods conveyor is an additional conveyor, and wherein the workstation comprises a working region, wherein the returned-goods conveyor, the storage-container conveyor and the order-container conveyor for delivering or moving away order containers are lead to the working region;
a method for storing returned goods of different type of goods in the order-picking system, the method comprising the following steps:
providing at least one returned good of a first type of goods at the delivering station;
detecting each of the returned goods with a detecting device and delivering the returned goods to the returned-goods conveyor conveying the returned goods to the workstation;
identifying the type of goods of each of the detected returned goods with a warehouse-management system;
identifying a storage container with which the respectively identified type of goods is associated with the warehouse-management system;
retrieving the respectively associated storage container from the container warehouse, and conveying the retrieved associated storage container to the workstation by means of the storage-container conveyor; and
delivering the returned goods, at the workstation, to the associated storage container.

2. The method of claim 1, wherein the returned goods are separately delivering to the returned goods conveyor conveying the returned goods to the workstation.

3. The method of claim 1, wherein the retrieved storage containers are stored back into the container warehouse after a completed delivery of the returned goods.

4. The method of claim 1, wherein the container warehouse comprises at least one horizontally rotating container rack.

5. The method of claim 1, wherein a length or transporting velocity of the returned-goods conveyor towards the workstation is selected such that sufficient time is remaining for sequencing the storage containers to be retrieved.

6. The method of claim 1, wherein, during the step of detecting, additionally a number of returned goods of the same type of goods, which is to be delivered to the returned-goods conveyor, are additionally detected.

7. The method of claim 1, comprising the additional steps:
providing a storage-container conveyor between the at least one workstation and the container warehouse for supplying and transporting away storage containers; and
providing an order-container conveyor for delivering and transporting away order containers to and from the workstation.

8. The method of claim 7, wherein the order-container conveyor is arranged, at least in a region of the workstation, lower than the storage-container conveyor.

9. The method of claim 7, wherein the storage-container conveyor is the returned-goods conveyor, and in the return mode the storage-container conveyor is operated in an opposite direction in comparison to the picking mode.

10. An order-picking system for handling returned goods of different types of goods comprising:
a container warehouse for providing a plurality of storage containers;
at least one workstation arranged as an order-picking station in a picking mode;
at least one delivery station having a detecting device, where returned goods are provided and detected;
a returned-goods conveyor arranged to convey returned goods from the delivery station to the workstation;
a storage-container conveyor arranged to convey storage containers to the workstation;
an order-container conveyor arranged to convey order containers to the workstation, wherein the returned-goods conveyor is an additional conveyor; and
a warehouse-management system being configured, in a return mode, to identify detected returned goods with respect to the type of goods thereof, in order to retrieve storage containers, which are associated with the identified type of goods, from the container warehouse, and convey them to the workstation, where the identified returned goods are delivered to the associated storage containers, and being configured, in the picking mode, to retrieve storage containers from the container warehouse and to convey them to the workstation where goods are picked from the storage containers into order containers.

11. The system of claim 10, wherein the delivery station is coupled to the storage-container conveyor, which in the return mode is used as the returned-goods conveyor, wherein a conveying direction is reversed in comparison to a picking mode.

12. The system of claim 10, wherein the returned-goods conveyor represents a separate conveyor relative to the storage-container conveyor.

13. The system of claim 12, wherein the returned-goods conveyor comprises a handing-over location at each of the workstations, where the returned goods can be delivered from the top to the bottom into the associated storage containers.

14. The system of claim 10, further comprising an order-container conveyor, on which substantially order containers are conveyed, if the system is operated in a picking mode, and on which, in the return mode, substantially associated storage containers are conveyed.

15. The system of claim 10, wherein the returned-goods conveyor comprises a returned-goods sequencing device.

16. The system of claim 10, wherein the conveyor, which is provided for the conveyance of the associated storage containers in the return mode, comprises a storage-container sequencing device.

* * * * *